(12) United States Patent
Masunaga et al.

(10) Patent No.: US 12,252,131 B2
(45) Date of Patent: Mar. 18, 2025

(54) CONTROL APPARATUS FOR HYBRID ELECTRICALLY-OPERATED VEHICLE

(71) Applicant: TOYOTA JIDOSHA KABUSHIKI KAISHA, Toyota (JP)

(72) Inventors: Seiji Masunaga, Toyota (JP); Shingo Eto, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/086,970

(22) Filed: Dec. 22, 2022

(65) Prior Publication Data

US 2023/0219573 A1    Jul. 13, 2023

(30) Foreign Application Priority Data

Jan. 13, 2022 (JP) ................. 2022-003910

(51) Int. Cl.
*B60W 30/00* (2006.01)
*B60W 10/02* (2006.01)
(Continued)

(52) U.S. Cl.
CPC ............ *B60W 30/20* (2013.01); *B60W 10/02* (2013.01); *B60W 10/06* (2013.01); *B60W 10/08* (2013.01);
(Continued)

(58) Field of Classification Search
CPC ...... B60W 30/20; B60W 10/02; B60W 10/06; B60W 10/08; B60W 20/40; B60W 2030/203; B60W 2400/00; B60W 2710/06
(Continued)

(56) References Cited

U.S. PATENT DOCUMENTS

2008/0249690 A1\* 10/2008 Matsumoto ............. F16F 15/02
180/69.6
2012/0083953 A1    4/2012 Izawa et al.
(Continued)

FOREIGN PATENT DOCUMENTS

JP    2009-284676 A    12/2009
JP    2012-076537 A    4/2012
(Continued)

*Primary Examiner* — Mahmoud S Ismail
(74) *Attorney, Agent, or Firm* — Oliff PLC

(57) ABSTRACT

A control apparatus for a hybrid electrically-operated vehicle that includes an engine, a rotating machine, a transmission apparatus and an engine connection/disconnection device which is to be engaged to connect a power transmission between the engine and the transmission apparatus and which is to be released to disconnect the power transmission between the engine and the transmission apparatus. The control apparatus executes a vibration suppression control by using a first vibration model in which the engine connection/disconnection device is engaged and a second vibration model in which the engine connection/disconnection device is released, such that the vibration suppression control is executed also during a switch control for switching between an engine driving mode and a motor driving mode, by using one of the first and second vibration models which is used in execution of the vibration suppression control before start of the execution of the switch control.

7 Claims, 3 Drawing Sheets

(51) Int. Cl.
*B60W 10/06* (2006.01)
*B60W 10/08* (2006.01)
*B60W 20/40* (2016.01)
*B60W 30/20* (2006.01)

(52) U.S. Cl.
CPC ....... *B60W 20/40* (2013.01); *B60W 2030/203* (2013.01); *B60W 2400/00* (2013.01); *B60W 2710/06* (2013.01)

(58) Field of Classification Search
USPC ......................................................... 701/22
See application file for complete search history.

(56) References Cited

U.S. PATENT DOCUMENTS

| 2013/0085634 | A1* | 4/2013 | Jinbo | .................... | B60W 20/00 903/903 |
| 2020/0259431 | A1* | 8/2020 | Sawada | ..................... | H02P 5/46 |

FOREIGN PATENT DOCUMENTS

| JP | 2012-091584 A | 5/2012 |
| JP | 2013-075591 A | 4/2013 |
| JP | 2020-029168 A | 2/2020 |

* cited by examiner

K0-ENGAGED-CASE VIBRATION MODEL Mhev

K0-RELEASED-CASE VIBRATION MODEL Mbev

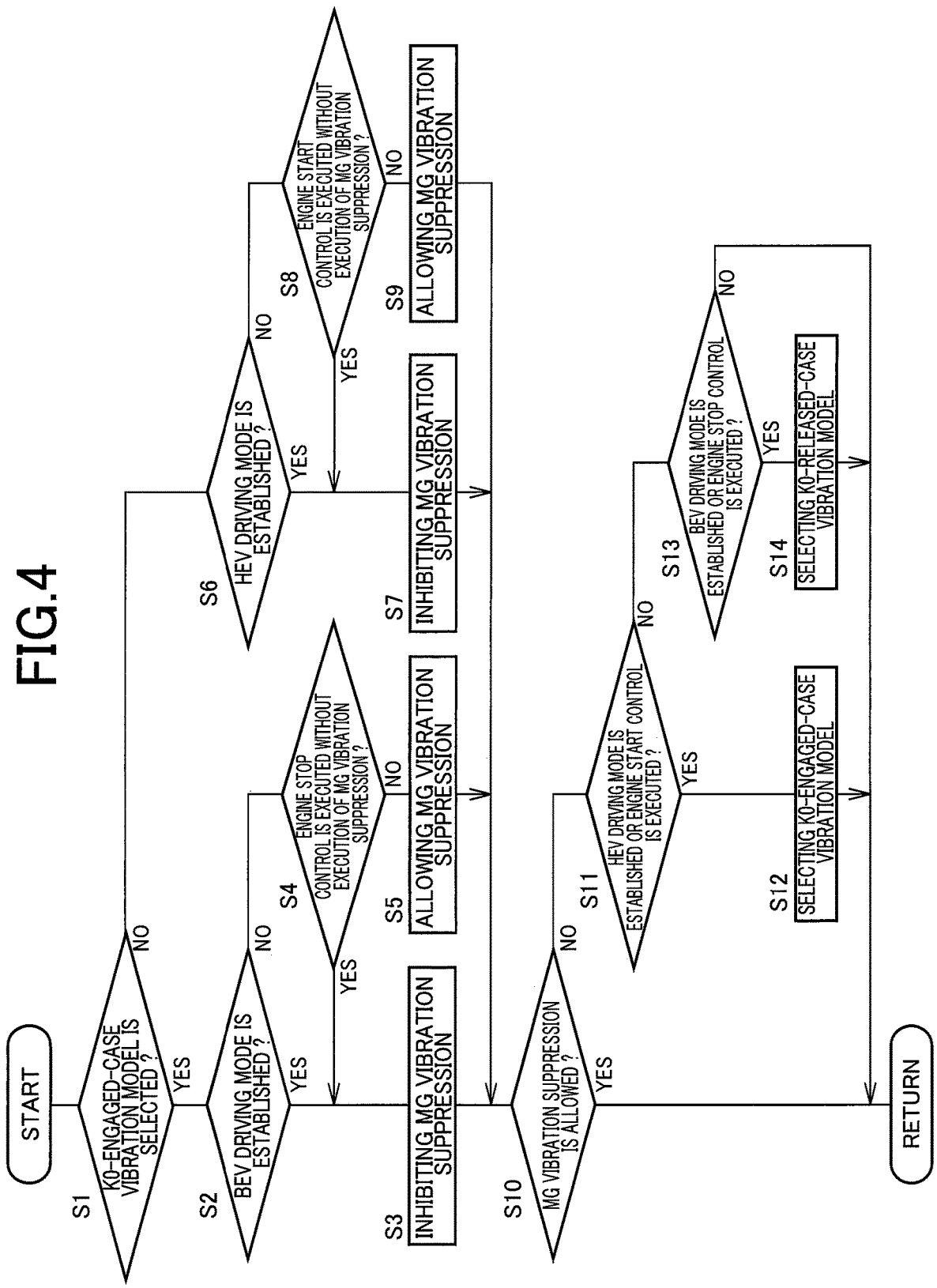

CONTROL APPARATUS FOR HYBRID ELECTRICALLY-OPERATED VEHICLE

This application claims priority from Japanese Patent Application No. 2022-003910 filed on Jan. 13, 2022, the disclosure of which is herein incorporated by reference in its entirety.

FIELD OF THE INVENTION

The present invention relates to a control apparatus for a hybrid electrically-operated vehicle, and more particularly, to techniques of suppressing torsional vibration in a power transmission apparatus, by estimating the torsional vibration by using a preformulated vibration model, and controlling a torque of a rotating machine.

BACKGROUND OF THE INVENTION

JP-2009-284676A discloses techniques of a vibration suppression control for estimating torsional vibration of a power transmission apparatus of a vehicle, based on a preformulated vibration model, and controlling a torque of a rotating machine so as to suppress the torsional vibration. JP-2013-75591A discloses a control apparatus for a hybrid electrically-operated vehicle that is provided with (i) a drive power source including an engine and a rotating machine, (ii) drive wheels, (iii) a power transmission apparatus configured to transmit a power from the drive power source to the drive wheels and (iv) an engine connection/disconnection device configured to connect and disconnect transmission of the power between the power transmission apparatus and the engine, wherein the control apparatus includes: a hybrid control portion configured to switch between an engine driving mode and a motor driving mode, such that the vehicle is driven to run by using at least the engine in a connection state in which the engine is connected to the power transmission apparatus when the engine driving mode is established, and such that the vehicle is driven to run by using the rotating machine in a disconnection state in which the engine is disconnected from the power transmission apparatus when the motor driving mode is established.

SUMMARY OF THE INVENTION

Where the torsional vibration of the power transmission apparatus is intended to be suppressed by using the techniques disclosed in JP-2009-284676A, the engine driving mode (in which the engine is connected to the power transmission apparatus) and the motor driving mode (in which the engine is disconnected from the power transmission apparatus) are different from each other in terms of a rotational inertia, so that a resonance frequency of the torsional vibration varies between the engine driving mode and the motor driving mode. It is therefore necessary to prepare two kinds of vibration models and to execute the vibration suppression control by using one of the two kinds of vibration models that is to be selected depending on which one of the engine driving mode and the motor driving mode is established, wherein the two kinds of vibration models are a first vibration model in which the engine connection/disconnection device is engaged and a second vibration model in which the engine connection/disconnection device is released. In that case, the vibration suppression control is inhibited in process of switch of the driving modes, and is newly started with newly selected one of the two kinds of vibration models after the switch of the driving modes is completed. However, the effect of the vibration suppression control is obtained with a certain response delay, because data collected for a certain length of time to a current point of time is required to estimate the torsional vibration by the vibration model. If the vibration suppression control is suspended until the switch of the driving modes is completed, the vibration suppression control is practically ineffective for a large length of time that corresponds to a sum of a time of collection of the data and a time of inhibition of the vibration suppression control during the switch of the driving modes, so that the torsional vibration could be undesirably increased.

The present invention was made in view of the background art described above. It is therefore an object of the present invention to suppress increase of torsional vibration in process of switch of driving modes in a vibration suppression control that is executed by using one of two kinds of vibration models that is to be selected depending on an established one of the driving modes.

The object indicated above is achieved according to the following aspects of the present invention.

According to a first aspect of the invention, there is provided a control apparatus for an electrically-operated vehicle that is provided with (i) a drive power source including an engine and a rotating machine, (ii) drive wheels, (iii) a power transmission apparatus configured to transmit a power from the drive power source to the drive wheels and (iv) an engine connection/disconnection device which is configured, when being engaged, to connect transmission of the power between the power transmission apparatus and the engine, and which is configured, when being released, to disconnect the transmission of the power between the power transmission apparatus and the engine. The control apparatus includes: (a) a hybrid control portion configured to switch between an engine driving mode and a motor driving mode, such that the vehicle is driven to run by using at least the engine in a connection state in which the engine connection/disconnection device connects the engine to the power transmission apparatus when the engine driving mode is established, and such that the vehicle is driven to run by using the rotating machine in a disconnection state in which the engine connection/disconnection device disconnects the engine from the power transmission apparatus when the motor driving mode is established, and (b) a vibration-suppression control portion configured to execute a vibration suppression control for estimating torsional vibration of the power transmission apparatus, based on a preformulated vibration model, and controlling a torque of the rotating machine or another rotating machine that is connected to the power transmission apparatus, so as to suppress the torsional vibration. The vibration-suppression control portion is configured, when the engine driving mode is established, to execute the vibration suppression control by using, as the vibration model, a first vibration model in which the engine connection/disconnection device is engaged, and is configured, when the motor driving mode is established, to execute the vibration suppression control by using, as the vibration model, a second vibration model in which the engine connection/disconnection device is released. When a switch control is executed by the hybrid control portion to switch between the engine driving mode and the motor driving mode, the vibration-suppression control portion is configured, in a case in which the vibration suppression control is executed since before start of execution of the switch control, to continue to execute the vibration suppression control in process of the switch control, by using one of the first vibration model and the second vibration model which is used in execution of the vibration suppression control before the start of the execution of the switch control.

According to a second aspect of the invention, in the control apparatus according to the first aspect of the invention, when the switch control is executed by the hybrid control portion to switch between the engine driving mode and the motor driving mode, the vibration-suppression control portion is configured, in the case in which the vibration suppression control is executed since before the start of the execution of the switch control, to continue to execute the vibration suppression control until completion of the switch control, by using the one of the first vibration model and the second vibration model which is used in the execution of the vibration suppression control before the start of the execution of the switch control.

According to a third aspect of the invention, in the control apparatus according to the first or second aspect of the invention, in a case in which the engine driving mode is switched to the motor driving mode with the engine connection/disconnection device being released by the switch control executed by the hybrid control portion, when the vibration suppression control is being executed by using the first vibration model in the engine driving mode, the vibration-suppression control portion is configured to configured to continue to execute the vibration suppression control by using the first vibration model in the process of the switch control.

According to a fourth aspect of the invention, in the control apparatus according to any one of the first through third aspects of the invention, in a case in which the motor driving mode is switched to the engine driving mode with the engine connection/disconnection device being engaged by the switch control executed by the hybrid control portion, when the vibration suppression control is being executed by using the second vibration model in the motor driving mode, the vibration-suppression control portion is configured to configured to continue to execute the vibration suppression control by using the second vibration model in the process of the switch control.

According to a fifth aspect of the invention, in the control apparatus according to any one of the first through fourth aspects of the invention, when the switch control is executed by the hybrid control portion to switch between the engine driving mode and the motor driving mode, the vibration-suppression control portion is configured, in a case in which the execution of the vibration suppression control is newly requested in the process of the switch control, to execute the vibration suppression control by using one of the first vibration model and the second vibration model which is to be used in one of the engine driving mode and the motor driving mode which is established after the execution of the switch control.

According to a sixth aspect of the invention, in the control apparatus according to the fifth aspect of the invention, wherein, when the engine driving mode is switched to the motor driving mode with the engine connection/disconnection device being released by the switch control executed by the hybrid control portion, the vibration-suppression control portion is configured, in a case in which the execution of the vibration suppression control is newly requested in the process of the switch control, to execute the vibration suppression control by using the second vibration model.

According to a seventh aspect of the invention, in the control apparatus according to the fifth or sixth aspect of the invention, wherein, when the motor driving mode is switched to the engine driving mode with the engine connection/disconnection device being engaged by the switch control executed by the hybrid control portion, the vibration-suppression control portion is configured, in a case in which the execution of the vibration suppression control is newly requested in the process of the switch control, to execute the vibration suppression control by using the first vibration model.

In the control apparatus according to any one of the first through seventh fifth aspects of the invention, in the case in which the vibration suppression control is executed since before start of execution of the switch control that is executed by the hybrid control portion to switch between the engine driving mode and the motor driving mode, the vibration suppression control is continued to be executed also in the process of the switch control, by using one of the first vibration model and the second vibration model which is used in the execution of the vibration suppression control before the start of the execution of the switch control. Therefore, it is possible to reduce an ineffective period in which the vibration suppression control is ineffective during the switch of the driving modes, and accordingly to suppress increase of the torsional vibration. In the process of the switch control executed to switch the driving modes, an operation state (engaged/released state) of the engine connection/disconnection device is changed, so that neither the first vibration model nor the second vibration model might be precisely suitable. However, since the change of the operation state of the engine connection/disconnection device merely causes a state of connection of the engine to the power transmission apparatus to be changed, the torsional vibration can be effectively suppressed also by continuously executing the vibration suppression by using one of first and second vibration models which is used in the execution of the vibration suppression control before the start of the execution of the switch control.

In the control apparatus according to the second aspect of the invention, the vibration suppression control is continued to be executed until the completion of the switch control, by using the one of the first vibration model and the second vibration model which is used in the execution of the vibration suppression control before the start of the execution of the switch control. Therefore, it is possible to more reduce the ineffective period in which the vibration suppression control is ineffective during the switch of the driving modes, and accordingly to more suppress increase of the torsional vibration.

In the control apparatus according to any one of the fifth through seventh aspects of the invention, in the case in which the execution of the vibration suppression control is newly requested in the process of the switch control executed to switch between the engine driving mode and the motor driving mode, the vibration suppression control is executed by using one of the first vibration model and the second vibration model which is to be used in one of the engine driving mode and the motor driving mode which is established after the execution of the switch control. Therefore, it is possible to more appropriately suppress the torsional vibration as compared with a control arrangement in which the vibration suppression control is started to be executed after the completion of the switch control. In general, since the effect of the vibration suppression control is obtained with a certain response delay, if the vibration suppression control is suspended until the switch of the driving modes is completed, the vibration suppression control is practically ineffective for a large length of time that corresponds to a sum of a time of the response delay and a time of suspension of the vibration suppression control during the switch of the driving modes, so that the torsional vibration could be undesirably increased. However, by starting the vibration suppression control before the completion of the switch control, the torsional vibration can be appropriately suppressed in spite of the response delay.

BRIEF DESCRIPTION OF THE DRAWINGS

FIG. 4 is a flow chart showing a control routine to be executed by the vibration-suppression control portion that is functionally included in the electronic control apparatus of the hybrid electrically-operated vehicle shown in FIG. 1, when selection is to be made between the two kinds of vibration models that are to be used in execution of the vibration suppression control.

DETAILED DESCRIPTION OF PREFERRED EMBODIMENT

Figure 1:
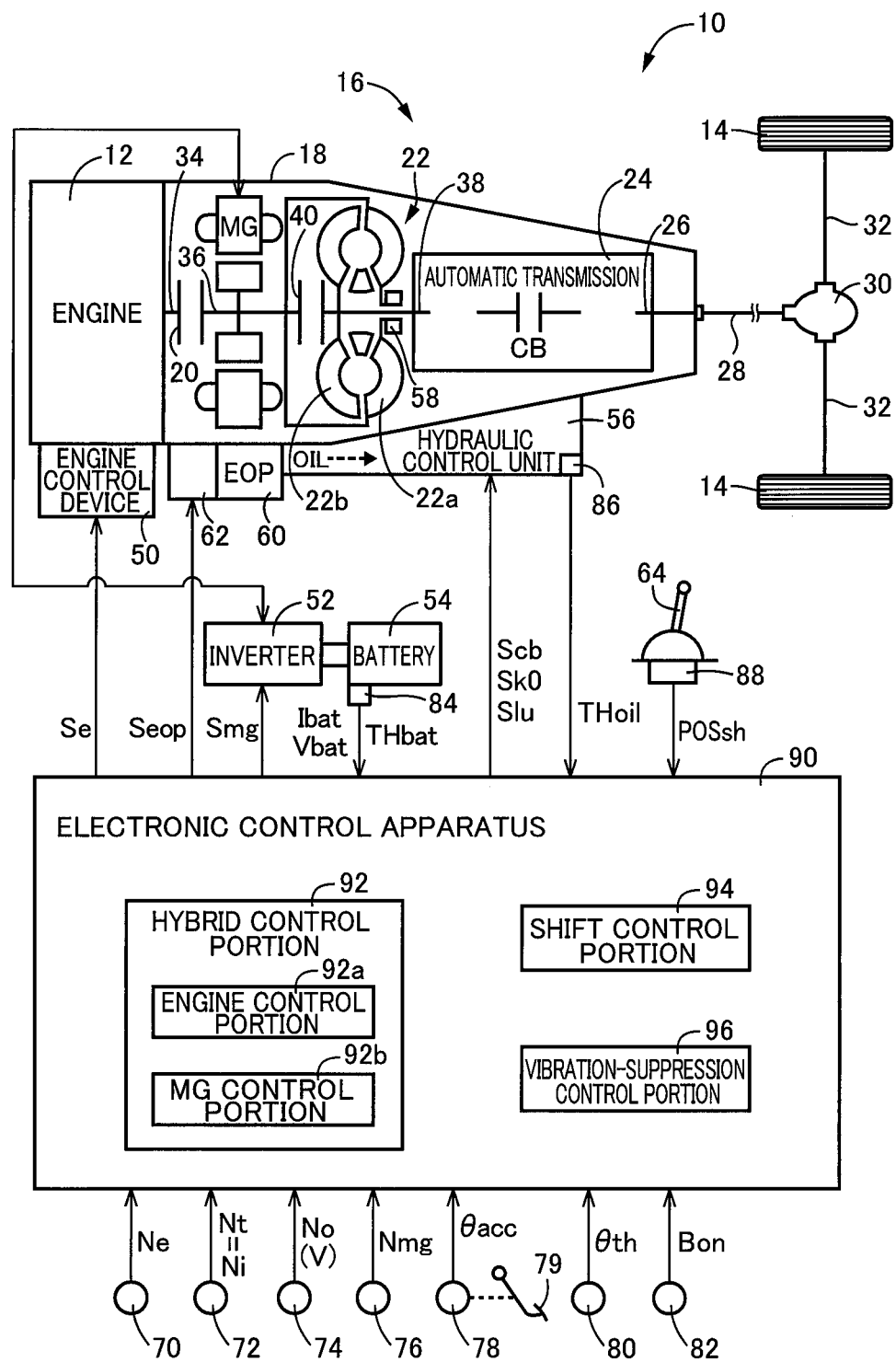
FIG. 1 is a view schematically showing a construction of a drive system of a hybrid electrically-operated vehicle including a control apparatus as an embodiment of the present invention, together with major portions of control functions and systems for executing various kinds of controls in the hybrid electrically-operated vehicle.

The present invention is applied to a hybrid electrically-operated vehicle including an engine and a rotating machine serving as drive power sources. The engine is an internal combustion engine such as gasoline engine and diesel engine, which is configured to generate a power by combustion of fuel. Although the rotating machine is constituted advantageously by a motor generator serving as an electric motor and also an electric power generator, it may be constituted also by an electric motor without function serving as an electric power generator. Although the rotating machine serving as the drive power source can be used as the rotating machine for executing the vibration suppression control for suppressing the torsional vibration in a drive system of the vehicle, the vibration suppression control may be also executed by using another rotating machine that is provided, in addition to the rotating machine serving as the drive power source, to serve to exclusively execute the vibration suppression control. As this rotating machine serving to exclusively execute the vibration suppression control, too, a motor generator serving as the electric motor and the electric power generator is advantageously used. The hybrid electrically-operated vehicle may be any one of various kinds of vehicles such as a rear-wheel drive vehicle of FR (front engine and rear drive) type, a front/rear wheel drive vehicle including a transfer that is provided in a power transmission path so as to distribute a power to front wheels, and a front-wheel drive vehicle of FF (front engine and front drive) type including a transaxle.

As the engine connection/disconnection device configured to connect and disconnect the engine to and from a power transmission apparatus, a friction engagement clutch is advantageously used. Where the engine is to be started so as to switch a motor driving mode to an engine driving mode, the engine can be cranked by a torque of the rotating machine with the engine connection/disconnection device being slip-engaged. However, upon switch of the driving modes, the engine can be started in any other manner. For example, it is possible to crank and start the engine by a starter motor or the like that is provided apart from the rotating machine, with the engine connection/disconnection device being kept released. The power transmission apparatus includes a differential gear device and/or drive shafts configured to distribute the drive power to left and right wheels, for example, and is provided with a transmission and/or a torque converter or other fluid transmission device, for example, as needed.

The vibration-suppression control portion is configured, when the switch control is executed to switch between the engine driving mode and the motor driving mode, to execute the vibration suppression control by using the vibration model that is used before start of the switch control. In this instance, the vibration-suppression control portion may be configured to continue executing the vibration suppression control until the switch control is completed, for example. However, it is also possible to terminate the vibration suppression control at a timing in process of the switch control, wherein the timing is determined depending on the operation state of the engine connection/disconnection device, for example. Further, it is also possible to switch the vibration model (that is used for the vibration suppression control) to another vibration model in process of the switch control. Moreover, the vibration-suppression control portion is configured, when execution of the vibration suppression control is newly requested in process of the switch control for switching between the engine driving mode and the motor driving mode, to execute the vibration suppression control by using the vibration model that is to be used one of the engine driving mode and the motor driving mode which is established after the execution of the switch control, for example. However, the vibration suppression control may be executed in any other manner. For example, it is also possible to select the vibration model, depending on a timing of the request for the execution of the vibration suppression control, or to wait for completion of the switch control so as to start the vibration suppression control upon the completion of the switch control.

EMBODIMENT

There will be described an embodiment of the present invention in details with reference to drawings. It is noted that figures of the drawings are simplified or deformed as needed, and each portion is not necessarily precisely depicted in terms of dimension ratio, angle, shape, etc.

FIG. 1 is a view schematically showing a construction of a drive system of a hybrid electrically-operated vehicle 10 (hereinafter simply referred to as "vehicle 10") including an electronic control apparatus 90 as an embodiment of the present invention, together with major portions of control functions and systems for executing various kinds of controls in the vehicle 10. As shown in FIG. 1, the vehicle 10 is a parallel-type hybrid electrically-operated vehicle including an engine 12 and a rotating machine MG as drive power sources for driving the vehicle 10. The vehicle 10 further includes a power transmission apparatus 16 that is provided in a power transmission path between the engine 12 and drive wheels 14. The drive wheels 14 are rear left and right wheels 14. The vehicle 10 is a front-engine rear-drive vehicle in which the engine 12 and the rotating machine MG are disposed in a front portion of the vehicle 10.

The engine 12 is an internal combustion engine such as gasoline engine and diesel engine. The vehicle 10 is provided with an engine control device 50 that includes a throttle actuator, a fuel injection device and an ignition device. With the engine control device 50 being controlled by the electronic control apparatus 90, an engine torque Te, which is an output torque of the engine 12, is controlled. The rotating machine MG is a motor generator having a function serving as an electric motor configured to generate a mechanical power from an electric power and a function serving as an electric power generator configured to generate an electric power from a mechanical power. The rotating machine MG is a three-phase AC synchronous motor, for example, and is connected to a battery 54 provided in the vehicle 10, through an inverter 52 provided in the vehicle 10. The inverter 52 is controlled by the electronic control apparatus 90 whereby an MG torque Tmg as a torque of the rotating machine MG and an MG rotational speed Nmg as a rotational speed of the rotating machine MG are controlled. The rotating machine MG receives the electric power from the battery 54 through the inverter 52, and generates a drive power for driving the vehicle 10, in place of or in addition to the engine 12. Further, when being driven and rotated by the power of the engine 12 or by a driven power inputted from the drive wheels 14, the rotating machine MG is subjected to the regenerative control so as to serve as the electric power generator for generating the electric power, and so as to generate a regenerative brake if being connected to the drive wheels 14. The electric power generated by the rotating machine MG is stored in the battery 54 through the inverter 52. The battery 54 serves as an electric storage device configured to receive and supply the electric power from and to the rotating machine MG.

The power transmission apparatus 16 includes a casing 18, a K0 clutch 20, a torque converter 22 and an automatic transmission 24. In the casing 18 that is a non-rotary member attached to a body of the vehicle 10, the engine 12, the K0 clutch 20, the torque converter 22 and the automatic transmission 24 are arranged in a series in this order of description in a direction away from the engine 12. The rotating machine MG is disposed between the K0 clutch 20 and the torque converter 22 in a power transmission path between the engine 12 and the drive wheels 14. The K0 clutch 20 is an engine connecting/disconnecting device that is disposed between the engine 12 and the rotating machine MG in the power transmission path, so as to selectively connect and disconnect between the rotating machine MG and the engine 12. The torque converter 22 is a fluid transmission device that is disposed between the rotating machine MG and the automatic transmission 24 in the in the power transmission path, so as to transmit the power through a working fluid OIL. The torque converter 22 is connected to the engine 12 through the K0 clutch 20. The automatic transmission 24 is connected to the torque converter 22, and is disposed between the drive power sources (the engine 12 and the rotating machine MG) and the drive wheels 14 and arranged in series with the torque converter 22. The power transmission apparatus 16 further includes a propeller shaft 28 connected to a transmission output shaft 26 as an output rotary member of the automatic transmission 24, a difference gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20 and an MG connection shaft 36 connecting between the K0 clutch 20 and the torque converter 22. The MG connection shaft 36 is connected to a rotor of the rotating machine MG.

The K0 clutch 20 is, for example, a wet-type or dry-type frictional engagement device (wet-type frictional engagement device in the present embodiment) constituted by a multiple-disc type or single-disc type clutch that is to be pressed by a hydraulic actuator. A K0 torque Tk0 as a torque capacity of the K0 clutch 20 is changed by a regulated K0 hydraulic pressure PRk0 supplied to the K0 clutch 20 from a hydraulic control unit (hydraulic control circuit) 56, whereby a control or operation state of the K0 clutch 20 is switched between an engaged state and a released state, for example. When the K0 clutch 20 is in the engaged state, the rotor of the rotating machine MG and a pump impeller 22a of the torque converter 22 are rotatable integrally with the engine 12 through the engine connection shaft 34. When the K0 clutch 20 is in the released state, transmission of the power between the engine 12 and the rotor of the rotating machine MG and the pump impeller 22a of the torque converter 22 is disconnected, whereby the engine 12 can be stopped.

The torque converter 22 includes the above-described pump impeller 22a connected to the MG connection shaft 36 and a turbine impeller 22b connected to an input shaft 38 as an input rotary member of the automatic transmission 24. The pump impeller 22a is connected to the engine 12 though the K0 clutch 20, and is connected directly to the rotating machine MG. The pump impeller 22a is an input member of the torque converter 22 while the turbine impeller 22b is an output member of the torque converter 22. The MG connection shaft 36 serves also as an input rotary member of the torque converter 22. The input shaft 38 is provided integrally with a turbine shaft that is to be driven and rotated by the turbine impeller 22b, and serves also an output rotary member of the torque converter 22. The torque converter 22 further includes an LU (lockup) clutch 40 that is configured to selectively connect and disconnect between the pump impeller 22a and the turbine impeller 22b. The LU clutch 40 is a known lockup clutch, i.e., a direct clutch provided to connect between the input and output members of the torque converter 22.

An LU clutch torque Tlu as a torque capacity of the LU clutch 40 is changed by a regulated LU hydraulic pressure PRlu supplied to the LU clutch 40 from the hydraulic control unit 56, whereby a control or operation state of the LU clutch 40 is switched among a fully released state, a slipping state and a fully engaged state. In the fully released sate, the LU clutch 40 is released whereby the torque converter 22 is placed in a torque-converter state providing a torque boosting effect. In the slipping state, the LU clutch 40 is engaged while slipping. In the fully engaged state that is a lockup state, the LU clutch 40 is engaged whereby the pump impeller 22a and the turbine impeller 22b of the torque converter 22 are to be rotated integrally with each other.

The automatic transmission 24 is a known planetary-gear-type automatic transmission including at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator, for example. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its controlled or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γ (=input rotational speed Ni/output rotational speed No), and wherein the plurality of gear positions include a plurality of forward-drive gear positions and a reverse-drive gear position. The automatic transmission 24 is configured to switch from one of the gear positions to another one of the gear positions, namely, to establish one of the gear positions which is selected, by the electronic control apparatus 90, depending on, for example, an acceleration operation made by a vehicle driver (operator) and a running speed V of the vehicle 10. With all of the engagement devices CB being released, the automatic transmission 24 is placed in a neutral state in which transmission of the power is disconnected. The input rotational speed Ni is a rotational speed of the input shaft 38, and is an input rotational speed of the automatic transmission 24. The input rotational speed Ni is also a rotational speed of the output member of the torque converter 22, and is equal to a turbine rotational speed Nt that is an output rotational speed of the torque converter 22. The output rotational speed No is a rotational speed of the transmission output shaft 26, and is an output rotational speed of the automatic transmission 24.

In the power transmission apparatus 16, when the K0 clutch 20 is engaged, the power outputted by the engine 12 is transmitted from the engine connection shaft 34 to the differential gear device 30 through the K0 clutch 20, MG connection shaft 36, torque converter 22, automatic transmission 24 and propeller shaft 28, and is then transmitted from the differential gear device 30 to the left and right drive wheels 14 with the power being distributed by the differential gear device 30 to the left and right drive shafts 32. Further, irrespective of the operation state of the K0 clutch 20, the power outputted by the rotating machine MG is transmitted from the MG connection shaft 36 to the differential gear device 30 through the torque converter 22, automatic transmission 24 and propeller shaft 28, and is then transmitted from the differential gear device 30 to the left and right drive wheels 14 with the power being distributed by the differential gear device 30 to the left and right drive shafts 32.

The vehicle 10 includes an MOP 58 that is a mechanical fluid pump (mechanical oil pump), an EOP 60 that is an electric fluid pump (electric oil pump) and a pump motor 62. The MOP 58 is connected to the pump impeller 22a, so as to be driven and rotated by the drive power sources (engine 12 and rotating machine MG) for outputting the working fluid OIL that is used in the power transmission apparatus 16. The pump motor 62 is an electric motor exclusively serving to drive and rotate the EOP 60. The EOP 60 is to be driven and rotated by the pump motor 62 so as to output the working fluid OIL at a desired timing, for example, during stop of the vehicle 10. The working fluid OIL outputted by the MOP 58 and/or EOP 60 is supplied to the hydraulic control unit 56. The hydraulic control unit 56 outputs the CB hydraulic pressure PRcb, K0 hydraulic pressure PRk0 and LU hydraulic pressure PRlu that have been regulated based on the working fluid OIL outputted by the MOP 58 and/or EOP 60. The working fluid OIL is supplied to the torque converter 22 so as to be used for transmitting the power, and is used for lubricating and cooling various parts of the power transmission apparatus 16. The working fluid OIL is stored in a fluid storage portion such as an oil pan, which is provided below the casing 18, and the stored working fluid OIL is pumped by the MOP 58 and/or the EOP 60 so as to be supplied to the hydraulic control unit 56.

The vehicle 10 is provided with the electronic control apparatus 90 as a control apparatus that is configured to perform various control operations. The electronic control apparatus 90 includes a so-called microcomputer incorporating a CPU, a ROM, a RAM and an input-output interface. The CPU performs the various control operations of the vehicle 10, by processing various input signals, according to control programs stored in the ROM, while utilizing a temporary data storage function of the RAM. The electronic control apparatus 90 includes a plurality of computers such as an engine control computer, an MG control computer and a hydraulic control computer, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of an MG speed sensor 76 indicative of the motor rotational speed Nm; an output signal of an accelerator-opening degree sensor 78 indicative of the accelerator opening degree (accelerator operation degree) θacc representing the amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; an output signal of a fluid temperature sensor 86 indicative of a working-fluid temperature THoil that is a temperature of the working fluid OIL in the hydraulic control unit 56; and an output signal of a lever position sensor 88 indicative of an operation position (lever position) POSsh of a shift lever 64 provided in the vehicle 10.

The shift lever 64 is disposed in vicinity of a driver seat of the vehicle 10, and is a shift operating member that is to be operated by the vehicle driver so as to switch a shift range in which the power is transmittable in the automatic transmission 24. The shift lever 64 is to be placed by the vehicle driver into one of the operation positions POSsh that include a P position, an R position, a N position and a D position. When the shift lever 64 is placed in the P position, the automatic transmission 24 is placed in a neutral state in which the transmission of the power is disconnected and a P (parking) range is selected to mechanically inhibit rotation of the output shaft 26, wherein the neutral state is a state in which all of the engagement devices CB are released, for example. When the shift lever 64 is placed in the R position, an R (reverse) range is selected to establish the reverse-drive gear position in the automatic transmission 24. When the shift lever 64 is placed in the N position, the automatic transmission 24 is placed in the neutral state (as when the shift lever 64 is placed in the P position) and a N (neutral)

range is selected. When the shift lever 64 is placed in the D position, a D (drive) range is selected to establish one of the four forward-drive gear positions 1st-4th which is to be automatically selected depending on an operation state such as the vehicle running speed V and the accelerator opening degree θacc, so as to drive the vehicle 10 with the selected one of the forward-drive gear positions. The shift lever 64 may be of a position-holding type so that the shift lever 64 is held in one of the operation positions POSsh into which the shift lever 64 has been placed. However, the shift lever 64 may be an automatic return type so that the shift lever 64 is automatically returned to a predetermined home position from one of the operation positions POSsh into which the shift lever 64 has been placed. Further, the shift operating member does not necessarily have to be constituted by the shift lever 64, but may be constituted by a push-button switch or the like for selecting one of shift ranges such as the above-described P range, R range, N range and D range.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the rotating machine MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal Slu that is to be supplied to the hydraulic control unit 56 for controlling the operation state of the LU clutch 40; and an EOP control command signal Seop that is to be supplied to the pump motor 62 for operating the EOP 60. The hydraulic control unit 56 is provided with a plurality of solenoid valves for switching fluid passages and controlling hydraulic pressures in accordance with the CB hydraulic control command signal Scb, K0 hydraulic control command signal Sko and hydraulic control command signal Slu.

For performing various controls in the vehicle 10, the electronic control apparatus 90 functionally includes a hybrid control portion 92, a shift control portion 94 and a vibration-suppression control portion 96.

The hybrid control portion 92 has a function of controlling cooperative operations of the engine 12 and the rotating machine MG, and includes an engine control portion 92a configured to control the engine 12 and an MG control portion 92b configured to control the rotating machine MG. The hybrid control portion 92 calculates the drive request amount requested to the vehicle 10 by the vehicle driver, by applying the accelerator opening degree θacc and the vehicle running speed V to a drive request amount map, for example, wherein the drive request amount is a requested drive torque Trdem that is to be applied to the drive wheels 14, for example. The hybrid control portion 92 obtains a requested TC input torque Ttcdem that is a required value of the input torque required to be inputted to the torque converter 22 for realizing the requested drive torque Trdem, for example, by taking account of various factors such as a transmission loss, an auxiliary load, the gear ratio γ of the automatic transmission 24 and a maximum chargeable amount Win and a maximum dischargeable amount Wout of the battery 54, and outputs the engine control command signal Se and the MG control command signal Smg for controlling the engine 12 and the rotating machine MG, respectively, such that the requested TC input torque Ttcdem can be obtained. The maximum chargeable amount Win and the maximum dischargeable amount Wout of the battery 54 are calculated, by the electronic control apparatus 90, based on the battery temperature THbat and the charged state value SOC [%] of the battery 54, for example. The charged state value SOC of the battery 54 is a value indicative of a charged state of the battery 54, i.e., an amount of the electric power stored or remaining in the battery 54, and is calculated by the electronic control apparatus 90, for example, based on the charging/discharging electric current Ibat and the voltage Vbat of the battery 54.

When the requested TC input torque Ttcdem can be covered by only the output of the rotating machine MG, the hybrid control portion 92 establishes a BEV (Battery Electric Vehicle) driving mode as a motor driving mode for causing the vehicle 10 to run by driving the rotating machine MG with only the electric power supplied from the battery 54. In the BEV driving mode, a BEV driving is performed to drive the vehicle 10 by using only the rotating machine MG as the drive power source while stopping the engine 12 with the K0 clutch 20 being placed in the released state. In the BEV driving mode, the MG torque Tmg is controlled such that the requested TC input torque Ttcdem is realized. When the requested TC input torque Ttcdem cannot be covered without using at least the output of the engine 12, the hybrid control portion 92 establishes an HEV (Hybrid Electric Vehicle) driving mode as an engine driving mode for causing the vehicle 10 to run by using at least the engine 12 as the drive power source while placing the K0 clutch 20 in the engaged state. In the HEV driving mode, the engine torque Te is controlled to realize all or a part of the requested TC input torque Ttcdem by the engine torque Te, and the MG torque Tmg is also controlled to compensate an insufficiency of the engine torque Te to the requested TC input torque Ttcdem, as needed. On the other hand, even when the requested TC input torque Ttcdem can be covered by only the output of the rotating machine MG, the hybrid control portion 92 establishes the HEV driving mode, for example, in a case in which the engine 12 or other parts of the power transmission apparatus 16 is required to be warmed up. Thus, the hybrid control portion 92 is configured, during the HEV driving, to automatically stop the engine 12 and to restart the engine 12 after having stopped the engine 12, and is configured, during the BEV driving, to start the engine 12 and to automatically stop and start the engine 12 when the vehicle 10 is being stopped. Thus, the hybrid control portion 92 switches between the BEV driving mode and the HEV driving mode, depending on the requested TC input torque Ttcdem or the like.

Figure 2:
FIG. 2 is a view showing two kinds of driving modes that are to be selectively established by a hybrid control portion that is functionally included in an electronic control apparatus of the hybrid electrically-operated vehicle shown in FIG. 1, and also a switch control that is to be executed to switch the two kinds of driving modes to each other.

The hybrid control portion 92 executes an engine stop control as a switch control for switching from the HEV driving mode to the BEV driving mode, wherein the engine stop control is executed to release the K0 clutch 20 and to stop the engine 12. In the engine stop control, a torque replacement control is executed to gradually increase the MG torque Tmg, such that a TC input torque Ttcin as an input torque of the torque converter 22 is not changed in spite of stop of the engine 12. The BEV driving mode is established when the torque replacement control is completed. Further, the hybrid control portion 92 executes an engine start control as the switch control for switching from the BEV driving mode to the HEV driving mode, wherein the engine start control is executed to engage the K0 clutch 20 and to start the engine 12. Specifically described, in the engine start control, with the K0 clutch 20 being slip-engaged, the engine 12 is cranked to increase the engine rotational speed Ne, and then with the K0 clutch 20 being fully engaged when the engine rotational speed Ne reaches the MG rotational speed Nmg that is dependent on the vehicle running speed V, engine start options such as fuel injection and ignition are executed with the engine 12 being connected to the MG connection shaft 36, whereby the engine 12 is started. When the engine rotational speed Ne is to be increased with the K0 clutch 20 being slip-engaged, a cranking-torque compensation control is executed to increase the torque Tmg of the rotating machine MG for suppressing drive torque fluctuation that is caused, for example, by inertia of the engine 12. Further, the torque replacement control is executed to gradually reduce the MG torque Tmg, such that the TC input torque Ttcin is not changed in spite of start of the engine 12. The HEV driving mode is established when the torque replacement control is completed. FIG. 2 is a view showing switch between the HEV driving mode and the BEV driving mode, and the engine stop control and the engine start control, wherein the engine stop control is to be executed in process of the switch from the HEV driving mode to the BEV driving mode, and the engine start control is to be executed in process of the switch from the BEV driving mode to the HEV driving mode The shift control portion 94 is configured, when the D range is selected, to determine whether a shifting action is required or not in the automatic transmission 24, by using a shifting map or the like that is predetermined with variables (relating to an operation state of the vehicle 10) such as the vehicle running speed V and the accelerator opening degree θacc, and to execute an automatic shift control for outputting the CB hydraulic control command signal Scb, as needed, by which a currently established one of the forward-drive gear positions is to be automatically switched to another one of the forward-drive gear positions in the automatic transmission 24, such that the outputted the CB hydraulic control command signal Scb is supplied to the hydraulic control unit 56. Further, when the shift lever 64 or other manual-shift operating member disposed in vicinity of the driver seat of the vehicle 10 is operated by the vehicle driver and a shift command signal is supplied to the shift control portion 94, the shift control portion 94 is configured to execute a manual shift control by which a currently established one of the forward-drive gear positions is to be switched to another one of the forward-drive gear positions in the automatic transmission 24, in accordance with the shift command signal. Moreover, when one of the operation positions POSsh is switched to another one of the operation positions POSsh by operation of the shift lever 64, the shift control portion 94 is configured to execute a so-called "garage control" for switching the shift range of the automatic transmission, in accordance with the another one of the operation positions POSsh.

When torsional vibration could be caused in a drive system, i.e., the power transmission apparatus 16, for example, upon acceleration of the vehicle 10, regenerative-brake release, accelerator tip-in or tip-out, the vibration-suppression control portion 96 is configured to execute a vibration suppression control for suppressing the torsional vibration. In the present embodiment, the vibration-suppression control portion 96 estimates the torsional vibration of the power transmission apparatus 16 by using a preformulated vibration model, and controls the torque Tmg of the rotating machine MG such that the torsional vibration is suppressed. Since the torsional vibration varies in characteristics depending on which one of the HEV driving mode (in which the K0 clutch 20 is engaged) and the BEV driving mode (in which the K0 clutch 20 is released) is being established, two kinds of the vibration models, i.e., a K0-engaged-case vibration model Mhev and a K0-released-case vibration model Mbev, are prepared for a case of engagement of the K0 clutch 20 and a case of release of the K0 clutch 20, respectively, so that the vibration suppression control is executed by using the K0-engaged-case vibration model Mhev in the HEV driving mode, and is executed by using the K0-released-case vibration model Mbev in the BEV driving mode. The vibration suppression control is executed in a predetermined case that requires execution of the vibration suppression control, such as a case of high probability of generation of the torsional vibration. It is noted that, since the vibration suppression control is executed by controlling the MG torque Tmg, the vibration suppression control will be referred also to as "MG vibration suppression".

Figure 3A:
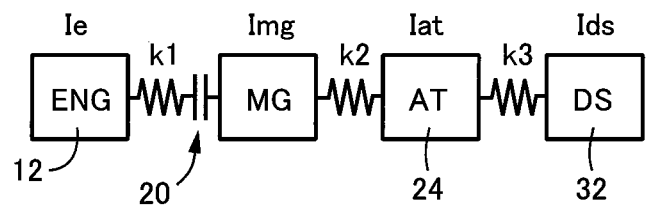
FIGS. 3A and 3B are views showing, by way of examples, two kinds of vibration models to be used by a vibration-suppression control portion that is functionally included in the electronic control apparatus of the hybrid electrically-operated vehicle shown in FIG. 1, for executing a vibration suppression control.
Figure 3B:
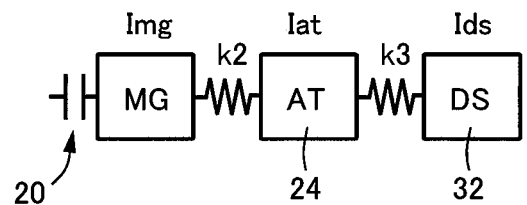

FIGS. 3A and 3B are view showing, by way of example, the K0-engaged-case vibration model Mhev and the K0-released-case vibration model Mbev, wherein "Ie" represents a rotational inertia of the engine 12, "Img" represents a rotational inertia of the rotating machine MG, "Iat" represents a rotational inertia of the automatic transmission 24 and "Ids" represents a rotational inertia of the drive shaft 32. These rotational inertias are calculated, for example, based on actual rotational speeds of the corresponding parts. Further, in FIGS. 3A and 3B, "k1", "k2" and "k3" are spring constants each of which is a predetermined constant value. Then, for example, resonance frequencies whey, wbev and torsion amounts σhev, σbev related to the torsional vibration are calculated based on the vibration models Mhev, Mbev, and the MG torque Tmg is controlled in a feedforward manner such that a damping torque (vibration suppression torque) Tmgvib is outputted from the rotating machine MG for cancelling the torsional vibration. That is, the rotating machine MG is controlled to output the MG torque Tmg that corresponds to a sum of a normally-requested MG torque Tmgdem (that is calculated based on the requested TC input torque Ttcdem) and the damping torque Tmgvib added to cancel the torsional vibration. The vibration models Mhev, Mbev shown in FIGS. 3A and 3B are just examples, and may be replaced by other vibration models using other physical quantities such as damping coefficients. The K0-engaged-case vibration model Mhev and the K0-released-case vibration model Mbev correspond to "first vibration model" and "second vibration model", respectively.

In response to request for execution of the MG vibration suppression, the vibration-suppression control portion 96 executes the MG vibration suppression by using the K0-engaged-case vibration model Mhev in the HEV driving mode, and executes the MG vibration suppression by using the K0-released-case vibration model Mbev in the BEV driving mode. Further, in process of switch of the driving modes such as upon executions of the engine stop control and the engine start control shown in FIG. 2, too, the vibration-suppression control portion 96 executes the MG vibration suppression in response to request for execution of the MG vibration suppression. It is an issue which one of the K0-engaged-case vibration model Mhev and the K0-released-case vibration model Mbev is to be used to execute the MG vibration suppression in each of the engine stop control and the engine start control. In the present embodiment, the vibration model, which is to be used to execute the MG vibration suppression, is selected by executing a control routine including steps S1 through S14, which are shown in a flow chart of FIG. 4. That is, when there is a request for execution of the MG vibration suppression during running of the vehicle 10 including during the engine stop control and during the engine start control, the MG vibration suppression is executed by using one of the vibration models Mhev, Mbev which is selected by execution of the control routine shown in the flow chart of FIG. 4. It is noted that, in the flow chart of FIG. 4, "YES" and "NO" in each of determination steps S1, S2, S4, S6, S8, S10, S11 and S13 (represented by rhombus shapes) represent affirmative determination and negative determination, respectively.

This control routine is executed repeatedly at a predetermined control cycle during operation of the vehicle 10, irrespective of whether the MG vibration suppression is being executed or not, and the vibration model to be used is determined upon request for the execution of the MG vibration suppression, for example, depending on an established one of the driving modes. As shown in FIG. 4, the control routine is initiated with step S1 that is implemented to determine whether the K0-engaged-case vibration model Mhev is being selected or not. When the K0-engaged-case vibration model Mhev is being selected, step S2 and the subsequent steps are implemented. When the K0-engaged-case vibration model Mhev is not being selected, namely, when the K0-released-case vibration model Mbev is being selected, step S6 and the subsequent steps are implemented. At step S2, which is implemented when the K0-engaged-case vibration model Mhev is being selected, it is determined whether the BEV driving mode is being established or not. When the BEV driving mode is being established, stepS3 is implemented to inhibit the MG vibration suppression. That is, in the BEV driving mode in which the K0 clutch 20 is released, the MG vibration suppression using the K0-engaged-case vibration model Mhev is unsuitable, so that the MG vibration suppression is inhibited and the selection of the vibration model is to be newly made. The K0-engaged-case vibration model Mhev is selected at step S12 when the HEV driving mode is being established or the engine start control is being executed. Therefore, normally, a negative determination (NO) is made at step S2, and step S4 and the subsequent steps are implemented. However, in a case in which the HEV driving mode is switched to the BEV driving mode via the engine stop control, with the K0-engaged-case vibration model Mhev being kept selected, an affirmative determination (YES) is made at step S2 whereby step S3 is implemented.

At step S4, it is determined whether the engine stop control is being executed without execution of the MG vibration suppression, or not. When an affirmative determination (YES) is made at step S4, step S3 is implemented to inhibit the MG vibration suppression. When a negative determination (NO) is made at step S4, step S5 is implemented to allow the MG vibration suppression. That is, in a case in which the K0-engaged-case vibration model Mhev is selected at step S12 when the HEV driving mode is being established or the engine start control is being executed, the subsequent cycle of the control routine is executed with an affirmative determination (YES) being made at step S1 and negative determinations (NO) being made at steps S2 and S4, whereby the MG vibration suppression is allowed at step S5 and the K0-engaged-case vibration model Mhev is kept selected. That is, in the case in which the K0-engaged-case vibration model Mhev is selected at step S12, the MG vibration suppression using the K0-engaged-case vibration model Mhev is executed when the MG vibration suppression is requested to be executed or when the MG vibration suppression is being executed. Further, in a case in which the HEV driving mode is switched to the engine stop control, too, when the MG vibration suppression is being executed, a negative determination (NO) is made at step S4 whereby the MG vibration suppression is allowed at step S5 and the K0-engaged-case vibration model Mhev is kept selected, so that the MG vibration suppression using the K0-engaged-case vibration model Mhev is continued. On the other hand, in a case in which the MG vibration suppression is not being executed when the HEV driving mode is switched to the engine stop control, or in a case in which the MG vibration suppression is terminated during the engine stop control, an affirmative determination (YES) is made at step S4 whereby the MG vibration suppression is inhibited at step S3. In this instance, since the MG vibration suppression is not being executed, the inhibition of the MG vibration suppression at step S3 does not affect the MG vibration suppression, i.e., the vibration suppression control.

Step S3 is followed by step S10 that is implemented to determine whether the MG vibration suppression is allowed or not. Since the MG vibration suppression is inhibited at step S3, a negative determination (NO) is made at step S10 whereby step S11 is implemented. At step S11 at which it is determined whether the HEV driving mode is being established or the engine start control is being executed, a negative determination (NO) is made at step S11 since step S3 is implemented when the BEV driving mode is being established or the engine stop control is being executed. The negative determination at step S11 is followed by step S13 that is implemented to determine whether the BEV driving mode is being established or the engine stop control is being executed. An affirmative determination (YES) is made at step S13 whereby step S14 is implemented to select the K0-released-case vibration model Mbev. When the BEV driving mode is being established or the engine stop control is being executed, the subsequent cycle of the control routine is executed with steps S1, S6 and S8 being followed by step S9 that is implemented to allow the MG vibration suppression and the K0-released-case vibration model Mbev is kept selected. Thus, when the MG vibration suppression is newly requested to be executed during the BEV driving mode or during the engine stop control, the MG vibration suppression using the K0-released-case vibration model Mbev is executed. On the other hand, in a case in which step S5 is followed by step S10, the K0-engaged-case vibration model Mhev is kept selected since the MG vibration suppression is allowed at step S5.

The selection of the vibration model to be used in the MG vibration suppression during the engine stop control is summarized as follows. In a case in which the MG vibration suppression using the K0-engaged-case vibration model Mhev is executed continuously since during the HEV driving mode, a negative determination (NO) is made at step S4 whereby step S5 is implemented to allow the MG vibration suppression, so that the MG vibration suppression using the K0-engaged-case vibration model Mhev is continued to be executed during the engine stop control. On the other hand, in a case in which the MG vibration suppression is not executed when the HEV driving mode is switched to the engine stop control, and in a case in which the MG vibration suppression is terminated during the engine stop control, an affirmative determination (YES) is made at step S4, and steps S3, S10, S11 and S13 are followed by step S14 that is implemented to select the K0-released-case vibration model Mbev. Then, the subsequent cycle of the control routine is executed with steps S1, S6, S8 and S9 being followed by step S10 and the K0-released-case vibration model Mbev being kept selected, so that, when the MG vibration suppression is newly requested to be executed during the engine stop control, the MG vibration suppression using the K0-released-case vibration model Mbev is executed.

At step S6, which is implemented when a negative determination (NO) is made at step S1, namely, when the K0-released-case vibration model Mbev is being selected, it is determined whether the HEV driving mode is being selected or not. When the HEV driving mode is being selected, step S7 is implemented to inhibit the MG vibration suppression. That is, in the HEV driving mode in which the K0 clutch 20 is engaged, the MG vibration suppression using the K0-released-case vibration model Mbev is unsuitable, so that the MG vibration suppression is inhibited and the selection of the vibration model is to be newly made. The K0-released-case vibration model Mbev is selected at step S14 when the BEV driving mode is being established or the engine stop control is being executed. Therefore, normally, a negative determination (NO) is made at step S6, and step S8 and the subsequent steps are implemented. However, in a case in which the BEV driving mode is switched to the HEV driving mode via the engine start control, with the K0-released-case vibration model Mbev being kept selected, an affirmative determination (YES) is made at step S6 whereby step S7 is implemented.

At step S8, it is determined whether the engine start control is being executed without execution of the MG vibration suppression, or not. When an affirmative determination (YES) is made at step S8, step S7 is implemented to inhibit the MG vibration suppression. When a negative determination (NO) is made at step S8, step S9 is implemented to allow the MG vibration suppression. That is, in a case in which the K0-released-case vibration model Mbev is selected at step S14 when the BEV driving mode is being established or the engine stop control is being executed, the subsequent cycle of the control routine is executed with negative determinations (NO) being made at steps S1, S6 and S8, whereby the MG vibration suppression is allowed at step S9 and the K0-released-case vibration model Mbev is kept selected. That is, in the case in which K0-released-case vibration model Mbev is selected at step S14, the MG vibration suppression using the K0-released-case vibration model Mbev is executed when the MG vibration suppression is requested to be executed or when the MG vibration suppression is being executed. Further, in a case in which the BEV driving mode is switched to the engine start control, too, when the MG vibration suppression is being executed, a negative determination (NO) is made at step S8 whereby the MG vibration suppression is allowed at step S9 and the K0-released-case vibration model Mbev is kept selected, so that the MG vibration suppression using the K0-released-case vibration model Mbev is continued. On the other hand, in a case in which the MG vibration suppression is not being executed when the BEV driving mode is switched to the engine start control, or in a case in which the MG vibration suppression is terminated during the engine start control, an affirmative determination (YES) is made at step S8 whereby the MG vibration suppression is inhibited at step S7. In this instance, since the MG vibration suppression is not being executed, the inhibition of the MG vibration suppression at step S7 does not affect the MG vibration suppression, i.e., the vibration suppression control.

Step S7 is followed by step S10 that is implemented to determine whether the MG vibration suppression is allowed or not. Since the MG vibration suppression is inhibited at step S7, a negative determination (NO) is made at step S10 whereby step S11 is implemented. At step S11 at which it is determined whether the HEV driving mode is being established or the engine start control is being executed, an affirmative determination (YES) is made at step S11 since step S7 is implemented when the HEV driving mode is being established or the engine start control is being executed. The affirmative determination at step S11 is followed by step S12 that is implemented to select the K0-engaged-case vibration model Mhev. When the HEV driving mode is being established or the engine start control is being executed, the subsequent cycle of the control routine is executed with steps S1, S2 and S4 being followed by step S5 that is implemented to allow the MG vibration suppression and the K0-engaged-case vibration model Mhev is kept selected. Thus, when the MG vibration suppression is newly requested to be executed during the HEV driving mode or during the engine start control, the MG vibration suppression using the K0-engaged-case vibration model Mhev is executed. On the other hand, in a case in which step S9 is followed by step S10, the K0-released-case vibration model Mbev is kept selected since the MG vibration suppression is allowed at step S9.

The selection of the vibration model to be used in the MG vibration suppression during the engine start control is summarized as follows. In a case in which the MG vibration suppression using the K0-released-case vibration model Mbev is executed continuously since during the BEV driving mode, a negative determination (NO) is made at step S8 whereby step S9 is implemented to allow the MG vibration suppression, so that the MG vibration suppression using the K0-released-case vibration model Mbev is continued to be executed during the engine start control. On the other hand, in a case in which the MG vibration suppression is not executed when the BEV driving mode is switched to the engine start control, and in a case in which the MG vibration suppression is terminated during the engine start control, an affirmative determination (YES) is made at step S8, and steps S7, S10 and S11 are followed by step S12 that is implemented to select the K0-engaged-case vibration model Mhev. Then, the subsequent cycle of the control routine is executed with steps S1, S2, S4 and S5 being followed by step S10 and the K0-engaged-case vibration model Mhev being kept, so that, when the MG vibration suppression is newly requested to be executed during the engine start control, the MG vibration suppression using the K0-engaged-case vibration model Mhev is executed.

As described above, in the vibration-suppression control portion 96 that is functionally included in the electronic control apparatus 90 for the vehicle 10 according to the present embodiment, in a case in which the MG vibration suppression is executed since before start of execution of the switch control (the engine stop control or the engine start control) that is executed by the hybrid control portion 92 to switch between the HEV driving mode and the BEV driving mode, the MG vibration suppression is continued to be executed also in the process of the switch control, by using one of the K0-engaged-case vibration model Mhev and the K0-released-case vibration model Mbev which is used in the execution of the MG vibration suppression before the start of the execution of the switch control. Described specifically, in a case in which the MG vibration suppression using the K0-engaged-case vibration model Mhev is executed in the HEV driving mode since before start of execution of the engine stop control, the MG vibration suppression using the K0-engaged-case vibration model Mhev is continued to be executed also after the HEV driving mode has been switched to the engine stop control. In a case in which the MG vibration suppression using the K0-released-case vibration model Mbev is executed in the BEV driving mode since before start of execution of the engine start control, the MG vibration suppression using the K0-released-case vibration model Mbev is continued to be executed also after the BEV driving mode has been switched to the engine start control. Therefore, it is possible to reduce an ineffective period in which the MG vibration suppression is ineffective during the switch of the driving modes, and accordingly to suppress increase of the torsional vibration. In the process of the switch control executed to switch the driving modes, the operation state of the K0 clutch 20 is changed, so that neither the K0-engaged-case vibration model Mhev nor the K0-released-case vibration model Mbev might be precisely suitable. However, since the change of the operation state of the K0 clutch 20 merely causes a state of connection of the engine 12 to the power transmission apparatus 16 to be changed, the torsional vibration can be effectively suppressed also by continuously executing the vibration suppression by using one of the K0-engaged-case vibration model Mhev and K0-released-case vibration model Mbev which is used in the execution of the MG vibration suppression before the start of the execution of the switch control.

Further, the MG vibration suppression is continued to be executed by using the one of the K0-engaged-case vibration model Mhev and the K0-released-case vibration model Mbev which is used in the execution of the MG vibration suppression before the start of the execution of the switch control, until the completion of the switch control, namely, until the BEV driving mode is established and an affirmative determination (YES) is made at step S2 (where the switch control is the engine stop control) or until the HEV driving mode is established and an affirmative determination (YES) is made at step S6 (where the switch control is the engine start control). Therefore, it is possible to more reduce the ineffective period in which the MG vibration suppression is made ineffective during the switch of the driving modes, and accordingly to more suppress increase of the torsional vibration.

Further, in a case in which the execution of the MG vibration suppression is newly requested in the process of the switch control executed to switch between the HEV driving mode and the BEV driving mode, the MG vibration suppression is executed by using one of the K0-engaged-case vibration model Mhev and the K0-released-case vibration model Mbev which is to be used in one of the HEV driving mode and the BEV driving mode which is established after the execution of the switch control. Therefore, it is possible to more appropriately suppress the torsional vibration as compared with a control arrangement in which the MG vibration suppression is started to be executed after the completion of the switch control. That is, in a case in which the execution of the MG vibration suppression is newly requested during the engine stop control, the K0-released-case vibration model Mbev is being selected because the engine stop control is being executed without the MG vibration suppression being executed just before the request for the execution of the MG vibration suppression, so that the MG vibration suppression is executed by using the K0-released-case vibration model Mbev that is to be used in the BEV driving mode established after the engine stop control. In a case in which the execution of the MG vibration suppression is newly requested during the engine start control, the K0-engaged-case vibration model Mhev is being selected because the engine start control is being executed without the MG vibration suppression being executed just before the request for the execution of the MG vibration suppression, so that the MG vibration suppression is executed by using the K0-engaged-case vibration model Mhev that is to be used in the HEV driving mode established after the engine start control. In general, since the effect of the MG vibration suppression is obtained with a certain response delay, if the MG vibration suppression is suspended until the switch of the driving modes is completed, the MG vibration suppression is practically made ineffective for a large length of time that corresponds to a sum of a time of the response delay and a time of suspension of the MG vibration suppression during the switch of the driving modes, so that the torsional vibration could be undesirably increased. However, by starting the MG vibration suppression before the completion of the switch control, the torsional vibration can be appropriately suppressed in spite of the response delay.

In the above-described embodiment, the vibration suppression control is executed to suppress the torsional vibration, by using the rotating machine MG that serves as the drive power source. However, apart from the rotating machine MG serving as the drive power source, another rotating machine may be provided to serve exclusively for the vibration suppression control such that the another rotating machine is connected to, for example, the MG connection shaft 36 and the input shaft 38.

It is to be understood that the embodiment described above is given for illustrative purpose only, and that the present invention may be embodied with various modifications and improvements which may occur to those skilled in the art.

NOMENCLATURE OF ELEMENTS
   10: hybrid electrically-operated vehicle
   12: engine (drive power source)
   14: drive wheel
   16: power transmission apparatus
   20: K0 clutch (engine connection/disconnection device)
   90: electronic control apparatus (control apparatus)
   92: hybrid control portion
   96: vibration-suppression control portion
   MG: rotating machine (drive power source)
   Mhev: K0-engaged-case vibration model (first vibration model)
   Mbev: K0-released-case vibration model (second vibration model)

What is claimed is:

1. A control apparatus for a hybrid electrically-operated vehicle that is provided with (i) a drive power source including an engine and a rotating machine, (ii) drive wheels, (iii) a power transmission configured to transmit a power from the drive power source to the drive wheels and (iv) an engine connection/disconnection device which is configured, when being engaged, to connect transmission of the power between the power transmission and the engine, and which is configured, when being released, to disconnect the transmission of the power between the power transmission and the engine, the control apparatus comprises a processor that is configured to:
switch between an engine driving mode and a motor driving mode, such that the vehicle is driven to run by using at least the engine in a connection state in which the engine connection/disconnection device connects the engine to the power transmission when the engine driving mode is established, and such that the vehicle is driven to run by using the rotating machine in a disconnection state in which the engine connection/disconnection device disconnects the engine from the power transmission when the motor driving mode is established, and
execute a vibration suppression control for estimating torsional vibration of the power transmission, based on a preformulated vibration model, and controlling a torque of the rotating machine or another rotating machine that is connected to the power transmission, so as to suppress the torsional vibration, wherein the processor is configured, when the engine driving mode is established, to execute the vibration suppression control by using, as the vibration model, a first vibration model in which the engine connection/disconnection device is engaged, and is configured, when the motor driving mode is established, to execute the vibration suppression control by using, as the vibration model, a second vibration model in which the engine connection/disconnection device is released, wherein, when a switch control is executed by the processor to switch between the engine driving mode and the motor driving mode, the processor is configured, in a case in which the vibration suppression control is executed since before start of execution of the switch control, to continue to execute the vibration suppression control in process of the switch control, by using one of the first vibration model and the second vibration model which is used in execution of the vibration suppression control before the start of the execution of the switch control.

2. The control apparatus according to claim 1, wherein, when the switch control is executed by the processor to switch between the engine driving mode and the motor driving mode, the processor is configured, in the case in which the vibration suppression control is executed since before the start of the execution of the switch control, to continue to execute the vibration suppression control until completion of the switch control, by using the one of the first vibration model and the second vibration model which is used in the execution of the vibration suppression control before the start of the execution of the switch control.

3. The control apparatus according to claim 1, wherein, in a case in which the engine driving mode is switched to the motor driving mode with the engine connection/disconnection device being released by the switch control executed by the processor, when the vibration suppression control is being executed by using the first vibration model in the engine driving mode, the processor is configured to configured to continue to execute the vibration suppression control by using the first vibration model in the process of the switch control.

4. The control apparatus according to claim 1, wherein, in a case in which the motor driving mode is switched to the engine driving mode with the engine connection/disconnection device being engaged by the switch control executed by the processor, when the vibration suppression control is being executed by using the second vibration model in the motor driving mode, the processor is configured to configured to continue to execute the vibration suppression control by using the second vibration model in the process of the switch control.

5. The control apparatus according to claim 1, wherein, when the switch control is executed by the processor to switch between the engine driving mode and the motor driving mode, the processor is configured, in a case in which the execution of the vibration suppression control is newly requested in the process of the switch control, to execute the vibration suppression control by using one of the first vibration model and the second vibration model which is to be used in one of the engine driving mode and the motor driving mode which is established after the execution of the switch control.

6. The control apparatus according to claim 5, wherein, when the engine driving mode is switched to the motor driving mode with the engine connection/disconnection device being released by the switch control executed by the processor, the processor is configured, in a case in which the execution of the vibration suppression control is newly requested in the process of the switch control, to execute the vibration suppression control by using the second vibration model.

7. The control apparatus according to claim 5, wherein, when the motor driving mode is switched to the engine driving mode with the engine connection/disconnection device being engaged by the switch control executed by the processor, the processor is configured, in a case in which the execution of the vibration suppression control is newly requested in the process of the switch control, to execute the vibration suppression control by using the first vibration model.

* * * * *